United States Patent [19]

Takayama

[11] Patent Number: 4,875,740
[45] Date of Patent: Oct. 24, 1989

[54] BRAKING DEVICE FOR USE IN A MOTOR VEHICLE

[75] Inventor: Toshio Takayama, Kanagawa, Japan

[73] Assignee: Tokico, Ltd., Japan

[21] Appl. No.: 298,314

[22] Filed: Jan. 17, 1989

Related U.S. Application Data

[63] Continuation of Ser. No. 13,420, Feb. 11, 1987, abandoned.

[30] Foreign Application Priority Data

Feb. 20, 1986 [JP] Japan .................................. 61-33531
Feb. 20, 1986 [JP] Japan ............................. 61-23307[U]
Apr. 18, 1986 [JP] Japan .................................. 61-58307

[51] Int. Cl.⁴ .................... B60T 15/04; B60T 8/86; F15B 13/10
[52] U.S. Cl. .................................... 303/50; 303/114; 303/93; 303/20; 303/101; 188/356; 91/391 A
[58] Field of Search ..................... 303/2, 3, 4, 15, 20, 303/50, 93, 100, 101, 104, 106, 108, 110, 114, 119; 188/1.11, 355, 356, 357; 192/1.21; 91/369.1, 369.2, 369.3, 369.4, 391 A, 391 R; 180/271, 281, 282

[56] References Cited

U.S. PATENT DOCUMENTS

| | | | |
|---|---|---|---|
| 3,364,818 | 1/1968 | Hager et al. | 91/376 X |
| 3,863,993 | 2/1975 | Fleischer et al. | 303/106 |
| 4,043,608 | 8/1977 | Bourg et al. | 303/104 |
| 4,512,615 | 4/1985 | Kita et al. | 303/114 X |
| 4,630,706 | 12/1986 | Takayama et al. | 303/114 X |
| 4,756,231 | 7/1988 | Kobayashi et al. | 91/391 R |
| 4,768,841 | 9/1988 | Watanabe | 303/114 |
| 4,778,223 | 10/1988 | Inoue | 303/93 X |
| 4,784,442 | 11/1988 | Petersen | 303/50 X |

FOREIGN PATENT DOCUMENTS

| | | |
|---|---|---|
| 0136689 | 4/1985 | European Pat. Off. . |
| 0136690 | 4/1985 | European Pat. Off. . |
| 1226844 | 10/1966 | Fed. Rep. of Germany . |
| 48-40265 | 11/1973 | Japan . |
| 60-157951 | 8/1985 | Japan ........................ 91/369 A |
| 0287855 | 12/1986 | Japan ........................ 303/101 |
| 0936197 | 9/1963 | United Kingdom ........ 91/369 A |

Primary Examiner—Andres Kashnikow
Assistant Examiner—Timothy Newholm
Attorney, Agent, or Firm—Wenderoth, Lind & Ponack

[57] ABSTRACT

A braking device for use in a motor vehicle has a vacuum motor having a casing, a power piston displaceably mounted in the casing through a diaphragm which partitions the interior of the casing into a constant pressure chamber and a variable pressure chamber and which is adapted to be displaced by the pressure difference between the two chambers. A input rod of the braking device is connected to the brake pedal. A valve mechanism is disposed in the power piston and controls the pressure in the variable pressure chamber in response to force applied to the input rod. A control valve is connected to the vacuum motor and adapted to be electrically controlled by a controller to selectively supply driving pressure to the vacuum motor. A manual actuator is provided for controlling the controller in response to operation of the actuator or a force applied to the actuator, and a sensor is provided for detecting the amount by which the actuator is moved or the amount of force applied to the actuator and for sensing an output corresponding to the amount detected by the sensor to the controller. The controller determines whether the amount detected by the sensor is on an increasing gradient or a decreasing gradient and controls the current to be supplied to the control valve in such a manner that the current changes along a hysteresis loop to minimize the hysteresis of the braking force to be generated.

4 Claims, 5 Drawing Sheets

BRAKING DEVICE FOR USE IN A MOTOR VEHICLE

This application is a continuation, of now abandoned application Ser. No. 07/013,420, filed Feb. 11, 1987 now abandoned.

BACKGROUND OF THE INVENTION

This invention relates to a braking device for use in a motor vehicle of the type that includes a vacuum motor having a constant pressure chamber and a variable pressure chamber formed therein, a power piston actuated by the pressure difference between the two chambers, an input rod connected to a brake pedal of the vehicle, and a valve mechanism for controlling the pressure in the variable pressure chamber in response to the input force applied to the input rod. More particularly, this invention relates to a braking device of the type mentioned above which further includes a control valve controlled electrically and remotely through a manual operation and adapted to be capable of controlling the vacuum motor without any need for the brake pedal to be depressed.

There has recently a demand for a enabling a braking force to be applied in a vehicle without any need for the brake pedal to be depressed. For this purpose, Robert R. Hager et al. disclosed in U.S. Pat. No. 3,364,818 a braking device in which pressure applied to a push button or the like arranged at a location near the driver's seat is mechanically transmitted to a relay valve and the pressure thereby generated is supplied to a vacuum motor to generate braking force. The vacuum motor has a shell and a power piston mounted in the shell through a diaphragm and serving to partition the interior of the shell into a variable pressure chamber and a constant pressure chamber. The power piston is displaced by virtue of pressure difference between the variable pressure chamber and the constant pressure chamber, thereby to move an output rod mounted on the power piston in the axial direction. However, in such a conventional braking device, the pressure applied to the push button has a certain special relationship with the braking force to be generated, and it is impossible to control the braking force finely. The characteristic curve (a) in FIG. 14 shows the relationship between pressure on the push button and the vacuum motor driving pressure generated in the relay valve. It is to be noted that this relationship has a hysteresis characteristic. The vacuum motor driving pressure is determined by pressure difference $(V_a - V_b)$, where $V_a$ denotes the degree of vacuum in the constant pressure chamber or in a vacuum source, and $V_b$ denotes the degree of vacuum in the variable pressure chamber. The characteristic curve (b) in FIG. 14 shows the relationship between the driving pressure for the vacuum motor or the brake system and a braking force or brake liquid pressure p to be generated, which also has a hysteresis characteristic. The curve (c) in FIG. 14 shows the relationship between the pressure applied to the push button and the brake liquid pressure. It is to be noted that this relationship has a particular characteristic with a large degree of ineffective input and a large amount of hysteresis because of the combination of the hysteresis factors of (a) and (b). Thus, it is also clear that it is impossible to control the braking force finely.

Japanese Patent Publication No. 48-40265 discloses a control device for controlling a vacuum motor in which a relay valve which generates pressure proportional to the input applied thereto is remotely controlled by utilizing hydraulic pressure to connect a variable pressure chamber and a constant pressure chamber of a vacuum motor to a vacuum source and the atmosphere, respectively, thereby controlling the vacuum motor. However, in this prior art, it is necessary for pipe means to be laid to connect relay valve to an actuating member, for example, a manual brake lever mounted by the driver's seat. The necessity to lay the pipe means in a limited space within the chassis of a vehicle causes various problems in terms of the need to arrange many different items of vehicle equipment.

SUMMARY OF THE INVENTION

The present invention aims to solve the problems described above and provides a braking device comprising a vacuum motor having a casing, a power piston displaceably mounted in the casing through a diaphragm and serving to partition the interior of the casing into a constant pressure chamber and a variable pressure chamber, and adapted to be actuated by the pressure difference between the two chambers, an input rod connected to a brake pedal, a valve mechanism disposed in the power piston and controlling the pressure in the variable pressure chamber in response to force applied to the input rod, a control valve connected to the vacuum motor and adapted to be electrically controlled, a controller for controlling the control valve to selectively supply driving pressure to the vacuum motor, a manual actuator for controlling the controller in response to operation of the actuator or force applied to the actuator, and a sensor for detecting the amount by which the actuator is moved or the amount of force applied to the actuator and for sending an output corresponding to the amount detected by the sensor to the controller. The controller determines whether the amount detected by the sensor is on an increasing gradient or a decreasing gradient and controls the current supplied to the control valve in such a manner that the current changes along a hysteresis loop, thereby minimizing the hysteresis of the braking force generated.

According to a preferred embodiment of the invention, the control valve consists of a relay valve and a proportional solenoid for actuating the relay valve in proportion to the current applied thereto.

According to another preferred embodiment the braking device further comprises a control chamber defined in the power piston and a partition wall displaceably mounted in the control chamber to define a second constant pressure chamber and a second variable pressure chamber. The control valve supplies driving pressure to the second variable pressure chamber and the partition wall is operatively connected to the valve mechanism such that the partition wall controls the valve mechanism in response to the pressure difference generated between the two second chambers, thereby to control the pressure in the first mentioned variable pressure chamber.

According to another preferred embodiment, the controller includes a low pass filter. The low pass filter only allows output of the sensor that is lower than a predetermined level to pass therethrough.

BRIEF DESCRIPTION OF THE DRAWINGS

Further objects and advantages of the invention will be apparent from the following detailed description taken with reference to the accompanying drawings in which:

FIGS. 2 and 1 are diagrams showing the characteristics of the braking device according to the first embodiment;

DETAILED DESCRIPTION OF THE PREFERRED EMBODIMENTS

Figure 1:
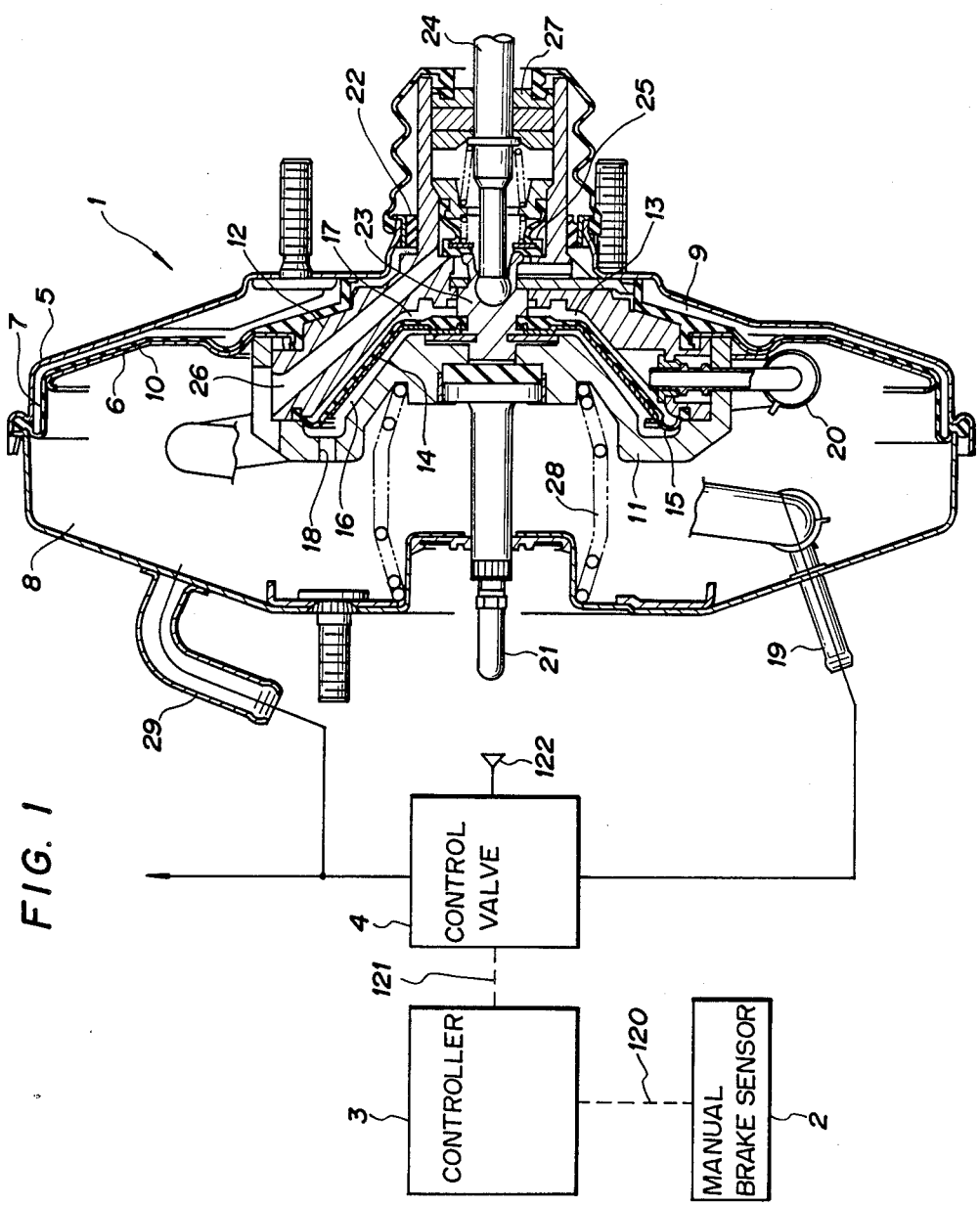
FIG. 1 is a schematic view of a braking device according to a first embodiment of the invention.

FIG. 1 shows a braking device for use in a motor vehicle according to the first embodiment of the invention, which is partially shown in a schematic manner. The braking device includes a vacuum motor 1, a manual brake sensor 2, a controller 3 and a control valve 4.

Firstly, an outline explanation of the vacuum motor 1 will be given. A power piston 6 is displaceably disposed in a body 5 of the vacuum motor 1 through a diaphragm 7. The power piston 6 and the diaphragm 7 define within the interior of the body 5 a first constant pressure chamber 8 at the front end and a first variable pressure chamber 9 at the rear end.

The power piston 6 consists of a piston 10, a piston holder 11 and a valve body 12. The piston 10 and the diaphragm 7 are secured to the valve body 12. Between the piston holder 11 and the valve body 12 is formed a control chamber 13, in which a control piston 14 is disposed through a control diaphragm 15. The control piston 14 and the control diaphragm 15 define within the interior of the control chamber 13 a second constant pressure chamber 16 at the front end and a second variable pressure chamber 17 at the rear end.

The second constant pressure chamber 16 permanently communicates with the first constant pressure chamber 8 through a passage 18 formed in the piston holder 11 and the second variable pressure chamber 17 communicates with a variable chamber connecting port 19 through a coil-shaped air passage 20. The port 19 is selectively caused to communicate with the control valve 4 to introduce air into the second variable pressure chamber 17. An output rod 21 is secured to the center portion of the piston holder 11 so as to transmit the displacement of the piston holder 11 to the outside of the body 5.

The rear portion of the valve body 12 projects to the rear side of the body 5 and is sealingly slideably supported through a seal member 22. The valve body 12 has a bore formed therein in which a plunger 23 is inserted slideably in the axial direction. The front end of the plunger 23 is secured to the control diaphragm 15 and the control piston 14. The plunger 23 is provided with a recess formed on the other end thereof which is adapted to receive a spherical portion formed at the front end of an input rod 24 which is actuated through a brake pedal (not shown). A poppet valve 25 is also axially displaceably disposed in the bore of the valve body 12. The poppet valve 25 is adapted to open and close one end of a passage 26 that communicates with the first constant pressure chamber 8. The rear end of the bore in the valve body 12 communicates with the atmosphere through an air filter 27. The valve body 12 and the plunger 23 are provided with respective valve seats which cooperate with the poppet valve 25 to constitute a vacuum valve and an air valve, respectively. Since such valves are well known in the art, explanation thereof is omitted here.

Shown at 28 is a return spring through which the power piston 6 is rearwardly biased. Shown at 29 is a constant pressure chamber connecting port which enables the first constant pressure chamber 8 to permanently communicate with a vacuum source (not shown).

It will be noted from the above explanation that when the input rod 24 is displaced forwardly when the brake pedal is depressed or when air is introduced into the second variable pressure chamber 17 to generate differential pressure between the second constant pressure chamber 16 and the second variable pressure chamber 17, the plunger 23 is at that time displaced forwardly. Then air flows into the first variable chamber 9 through the air valve which has now opened, the air filter 27 and so on, and differential pressure is generated between the first constant pressure chamber 8 and the first variable pressure chamber 9. As a result, the output rod 21 is displaced thereby to transmit an output force to a master cylinder (not shown). In this way it is possible to control the braking force of the brake not only by depressing the brake pedal but also by controlling the plunger 23 through air to be introduced into the second variable pressure chamber 17.

The control valve 4 consists of a proportional solenoid 52 and a relay valve 53 secured to the proportional valve 52 through screws (not shown). O-ring 51a is interposed between the proportional solenoid 52 and the relay valve 53.

Figure 2:
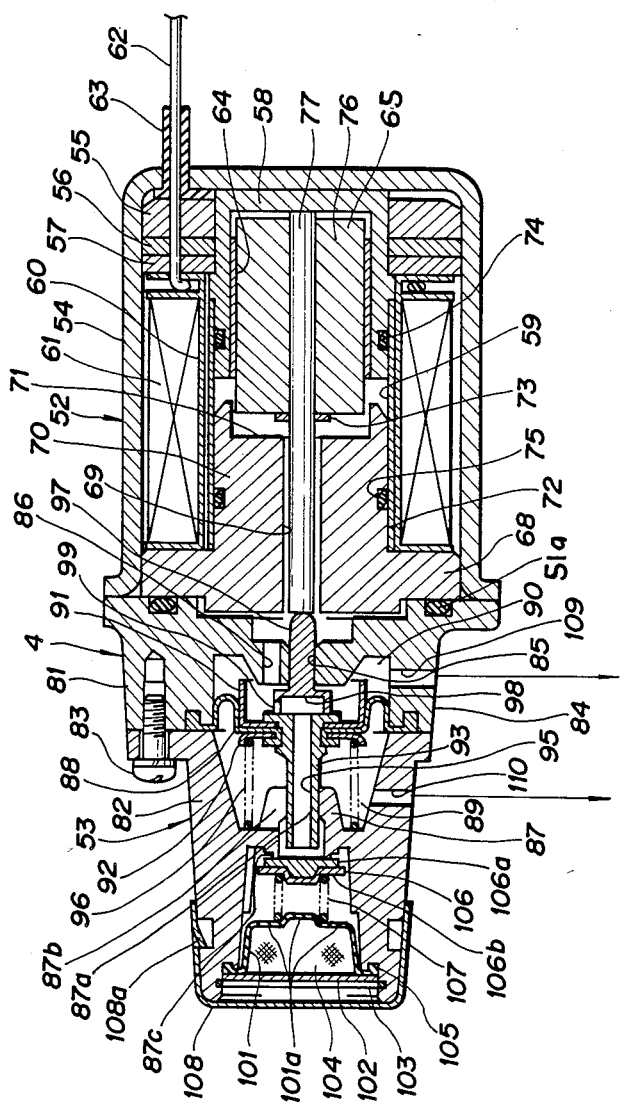
FIG. 2 is a sectional view of a control valve employed in the first embodiment.

The detailed constitution of the proportional valve is shown in FIG. 2. Shown at 54 is a case having the form of a cup with a flange. Ring-shaped spacers 55, 56 and 57 are disposed on the inner side of the bottom of the case 54 and a guide member 58 is fitted into the spacers 55, 56 and 57.

A coil 61 wound on a bobbin 60 is fitted around the guide member 58 through a sleeve 59. A plurality of leads 62 of the coil 61 are extended to the outside of the case 54 through the spacers 55, 56 and 57 and the bottom of the case 54. The exit for leads 62 is sealed by a grommet 63 made of rubber.

A plunger 65 is slideably disposed in the guide member 58 through a sleeve 64. The plunger 65 consists of a sliding member 76 and a rod 77 made integral with the sliding member 76 by such means as press fitting. An end portion of the rod 77 on the side of the relay valve 53 projects out of the sliding member 76. The plunger 65 is displaceable in the direction of its axis and is guided by the guide member 58.

Provided on the side of the relay valve 53 within the case 54 are a base 70 having a flange 68 and a center bore 69. The base 70 is secured to the case with the flange 68 being press-fitted in an open end of the case, with a recess 71 formed on an end surface thereof on the side of the sliding member 76 and facing the same, this recess allowing the sliding member 76 to enter and with a trunk 72 being fitted into the sleeve 59. A spacer 73 for adjusting the stroke of the plunger 65 is interposed between the recess 71 and the sliding member 76, being fitted on the rod 77. The rod 77 is freely displaceable through the center bore 69. Shown at 74 is an O-ring for sealing the gap between the sleeve 59 and the guide member 58 and shown at 75 is an O-ring for sealing the gap between the sleeve 59 and the base 70.

The case 54, spacers 55, 56 and 57, guide member 58, sleeve 64, sliding member 76, rod 77 and base 70 are made of ferrous material, and the sleeve 59 and spacer 73 are made of non-ferrous material.

The detailed constitution of the relay valve 53 is also shown in FIG. 2. A body 84 consists of two parts which are secured to each other by a plurality of bolts 83, one of the parts being a first body member 81 having a hollow and the other being a second body member 82 which faces the first body member.

Formed within the first body member 81 is a partition wall having a bore 85 and an air passage 86 therein.

Also formed within the second body member 82 is a partition wall having a boss 87 thereon.

A diaphragm 88 is interposed between the first and the second body members 81, 82. The diaphragm 88 defines within the interior of the body a variable pressure chamber 89 and a constant pressure chamber 90. A cup-shaped reacting piston 91 is mounted on the diaphragm 88 on the side of the first body member 81, while a ring plate 92 is mounted on the diaphragm 88 on the side of the second body member 82. A valve plunger 93 with a flange is secured to the diaphragm 88, reacting piston 91 and ring plate 92 being fitted into respective bores formed at the centers thereof. The ring plate 92 is mounted on the diaphragm 88 at the center thereof. The valve plunger 93 includes a through bore 95 formed at the center thereof and one end of the valve plunger is slideably inserted into a small diameter portion of a guide bore 87a formed in the boss 87 and consisting of a large diameter portion and this small diameter portion. Also formed in the boss is a cutout 87b which communicates with the large diameter portion of the guide bore 87a. A valve seat 87c is formed on the surface of the boss 87 that is opposite to the surface of the same which faces the diaphragm 88. A return spring 96 is interposed between the ring plate 92 and the partition wall of the second body member 82.

An input rod 97 is slideably inserted into the bore 85 in the partition wall of the first body member 81. The input rod 97 consists of a large diameter portion and a small diameter portion, with the large diameter portion having a recess 98 formed therein. A cutout passage 99 is formed in the side wall of the recess 98 and this passage communicates with the recess 98.

When the relay valve 53 is not actuated (FIG. 2), the input rod 97 is in contact with the valve plunger 93 and the rod 77.

A stepped portion is formed at the outer end of the second body member 82 and a filter case 101 is mounted on this stepped portion. A retainer 102 made of a porous plate such as punching metal is positioned on the outside of the filter case 101. The filter case 101 and the retainer 102 are secured to the second body member 82 by a stop ring 103 fitted on the second body member 82. The filter case 101 is provided with a plurality of air passage holes 101a and a filter 104 is accommodated therein. The gap between the second body member 82 and the filter case 101 is sealed by a ring 105 interposed therebetween, thereby preventing air from flowing into the body 84 without passing through the filter 104. A spring 107 and a poppet valve 106 are interposed between the filter case 101 and the valve seat 87c on the boss 87 such that the spring 107 will urge the poppet valve 106 against the valve seat 87c. The poppet valve 106 consists of a rubber plate 106a which comes into contact with the valve seat 87c and a metal plate 106b which is attached to the rubber plate 106a by curing of the same. A vacuum valve consists of the return spring 96, valve plunger 93, poppet valve 106 and so on, while an air valve consists of the poppet valve 106, spring 107, valve seat 87c and so on.

A cap 108 is mounted on the outside of the second body member. The cap 108 includes a plurality of claws 108a formed at the tip thereof. *The cap 108 is attached to the second body member 82 with the claws 108a being bent* to engage within a groove formed in the outer circumference of the second body member 82 and with a clearance therebetween, the cap 108 thereby preventing filthy water or the like from splashing the filter 104.

The first body member 81 is provided with a vacuum source connecting port 109 which allows the constant pressure chamber 90 to communicate with the outside thereof and which is connected to a vacuum source, while the second body member 82 is provided with a vacuum motor connecting port 110 which similarly allows the variable pressure chamber to communicate with the outside thereof and which is connected to the vacuum motor 1.

The vacuum source connecting port 109 and the vacuum motor connecting port 110 of the control valve 4 communicate with the constant chamber connecting port 29 and the variable chamber connecting port 19 of the vacuum motor 1, respectively. The vacuum source connecting port 109 and the constant chamber connecting port communicate with a common vacuum source such as an intake manifold of the engine of a automobile. The leads 62 of the coil 61 of the proportional solenoid are connected to an electric source.

The driver's compartment of a motor vehicle is provided with a manual brake lever or an actuating member (not shown) and a manual brake sensor 2, for example, a potentiometer for detecting the amount of movement of the manual brake lever or the turning angle of the manual brake lever. The controller 3 is connected to the manual brake sensor unit through a plurality of signal lines 120 and the control valve 4 is connected, in turn, to the controller 3 through a plurality of signal lines 121.

Next, the operation of the brake device described above will be explained. When a driver actuates the manual brake lever in order to make a fine adjustment of the braking force to be applied to a motor vehicle provided with the brake device according to the invention, the manual brake sensor 2 detects the amount of movement of the lever and sends signals representing the amount detected to the controller 3 through the signal lines 120. Then, the controller 3 energizes the proportional solenoid 52 of the control valve 4 in response to the signals received. Next, the control valve 4 feeds the air introduced into it through an air port 122 into the variable chamber connecting port 19.

The operation of the control valve 4 will be explained in detail below.

FIG. 2 shows the non-actuated condition of the control valve 41 wherein the second variable pressure chamber 17 is connected to a vacuum source through the coil shaped air passage 20, variable pressure chamber connecting port 19, vacuum motor connecting port 110, variable pressure chamber 89, cutout 87b, guide bore 87a, through bore 95, recess 98, cutout 99, constant pressure chamber 90 and vacuum source connecting port 109. Therefore, the pressure in the variable pressure chamber 89 and constant pressure chamber 90 is equal and the pressure in the second variable pressure chamber 17 and second constant pressure chamber 16 is also equal.

In this condition, when the coil 61 is energized, a magnetic circuit through the base 70, case 54, spacer 55, 56 and 57, guide member 58, sleeve 64, and sliding member 76 is formed and leftward thrust force (FIG. 2) is applied to the plunger 65.

Figure 3:
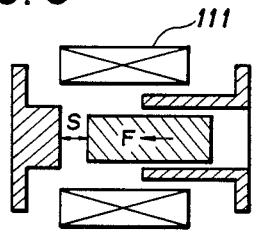
FIG. 3 is a schematic sectional view of a flat type solenoid.
Figure 4:
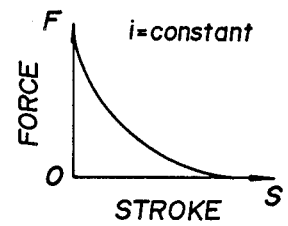
FIG. 4 is a diagram showing the characteristics of a flat type solenoid.
Figure 5:
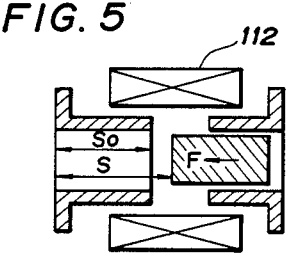
FIG. 5 is a schematic sectional view of a leakage type solenoid.
Figure 6:
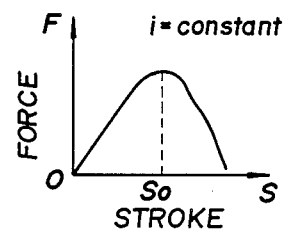
FIG. 6 is a diagram showing the characteristics of a leakage type solenoid.
Figure 7:
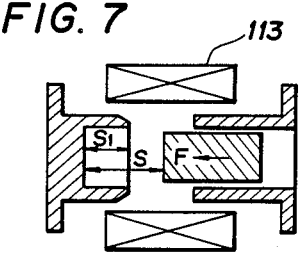
FIG. 7 is a schematic sectional view of a proportional type soleoid.
Figure 8:
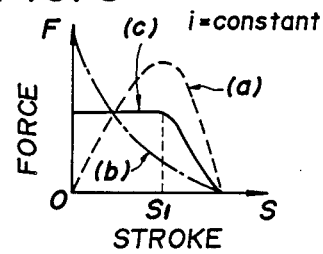
FIG. 8 is a diagram showing the characteristics of a proportionl type solenoid.
Figure 9:
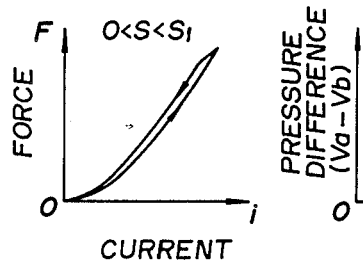
FIGS. 9 to 11 are diagrams showing the characteristics of the control valve shown in FIG. 2.

Here the proportional solenoid 52 functions, it being characterized in the relationship between the stroke S and the thrust force of the plunger 65. The relationship will briefly be explained, in theoretical terms. FIG. 3 shows the fundamental constitution of a flat type solenoid 111 and FIG. 4 shows the characteristics thereof. FIGS. 5 and 6 respectively show the fundamental constitution and characteristics of a leakage type solenoid 112. A proportional solenoid 113 has the characteristics shown in FIG. 8 which represent a combination of the characteristics of the flat type and leakage type solenoid, the fundamental constitution being shown in FIG. 7. Namely, the proportional solenoid 113 shown in FIG. 7 has the characteristics designated by the curve (c) in FIG. 8 which is a combination of curves (a) and (b) which show the characteristics of the flat type solenoid 111 and the leakage type solenoid 112, respectively. Thus, as shown in FIG. 9, a thrust force is generated which is proportional to the current flowing in a coil within the stroke between 0 (zero) and $S_1$.

The stroke $S_1$ may be determined to correspond to the stroke of the valve plunger 93 of the relay valve 53.

Returning to FIG. 2, the leftward thrust force applied to the plunger 65 is transmitted to the valve plunger 93 through the rod 77 and input rod 97, and the input rod 97 and the valve plunger 93 are displaced leftward as viewed in FIG. 2 against the return spring 96. Then, the valve plunger 93 at first abuts against the rubber plate 106a of the poppet valve 106 to close the vacuum valve and thereafter the valve plunger 93 moves the poppet valve 106 further leftward against the force of the poppet spring 107. Thus, the poppet valve 106 separates from the valve seat 87c to open the air valve and atmospheric air flows into the variable pressure chamber 89 through the clearance between the cap 108 and the second body member 82, the punched holes in the retainer 102, filter 104, air passages 101a, air valve (clearance between the poppet valve 106 and valve seat 87c), guide bore 87a and cutout 87b, and pressure difference is thus generated between the variable pressure chamber 89 and the constant pressure chamber 90. the atmospheric air introduced into the variable pressure chamber 89 further flows into the second variable pressure chamber 17 through the vacuum motor connecting port 110. Thus, a pressure difference is generated between the second variable pressure chamber 17 and the second constant pressure chamber 16, thereby moving the plunger 23 leftward as viewed in FIG. 1.

In this condition, atmospheric air flows into the variable pressure chamber 89 of the control valve 4 and the second variable pressure chamber 17 of the vacuum motor 1 until the thrust force applied to the plunger 65 comes into balance with the force caused by the pressure difference generated between the chambers on opposite sides of the reacting piston 91 or the variable pressure chamber 89 and the constant pressure chamber 90.

Figure 10:
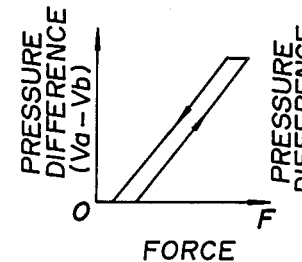
Figure 11:
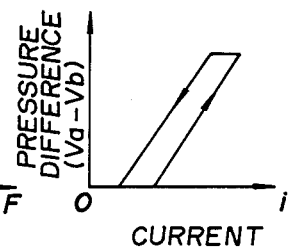

Therefore, if the degree of vacuum in the constant pressure chamber 90 is defined as $V_a$ and the degree of vacuum in the variable pressure chamber 89 as $V_b$, there exists a proportional relationship as shown in FIG. 10 between the thrust force acting on the plunger 65 and the pressure difference $V_a$-$V_b$ between the constant pressure chamber 90 and the variable pressure chamber 89 or the pressure difference between the second variable pressure chamber 17 and the second constant pressure chamber 16. Thus, when the proportional relationship aforementioned is combined with the characteristic of the proportional solenoid 52 shown in FIG. 9, it will be understood that the current i flowing in the coil 61 and the actuating pressure difference $V_a$-$V_b$ between the second variable chamber and the second constant pressure chamber have a mutually proportional relationship as shown in FIG. 11.

Figure 12:
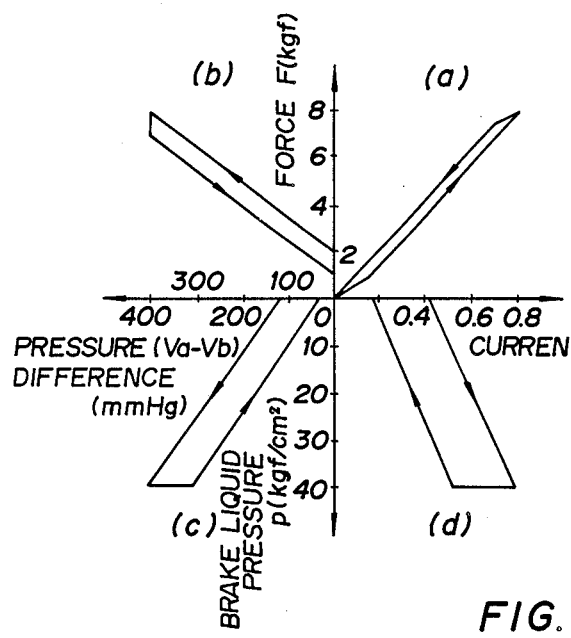

Here the relationship between the current flowing in the proportional solenoid 52 and the thrust force acting on the plunger 65 is shown by the characteristic curve (a) in FIG. 12, and the relationship between the thrust force of the relay valve 53 and the pressure difference to be generated $V_a$-$V_b$ is shown by the characteristic curve (b) in FIG. 12. Further, the relationship between the pressure difference $V_a$-$V_b$ generated between the vacuum motor 1 and the downstream brake system thereof and the liquid pressure to be generated is shown by the characteristic curve (c) in FIG. 12. Therefore, by combining the characteristic curves (a), (b) and (c), the relationship between the exciting current i of the proportional solenoid 52 and the liquid pressure to be generated is obtained, as shown by the characteristic curve (d) in FIG. 12, wherein the amounts of ineffective current and hysteresis are relatively large.

Figure 13:
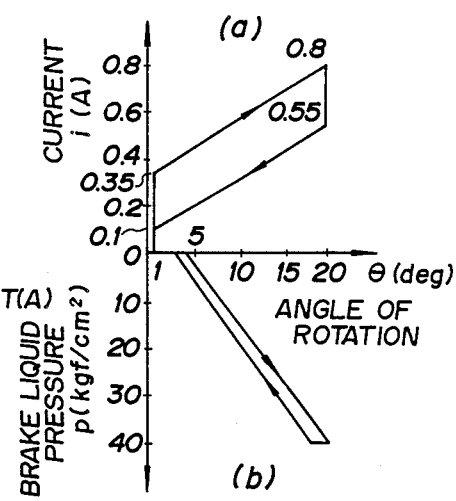
Figure 14:
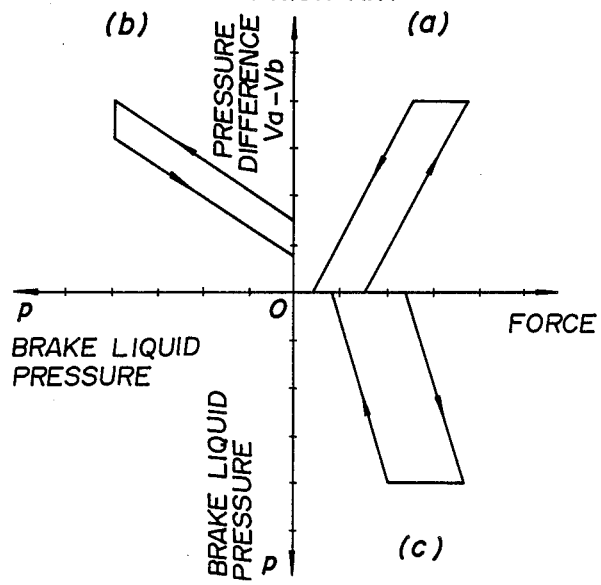
FIG. 14 is a diagram showing the characteristics of a prior art braking device.

However, the above-mentioned problems are solved by the present embodiment as described hereinafter. Namely, as shown by curve (a) in FIG. 13, in response to an angle of rotation θ of the manual brake lever which is detected through the manual brake sensor 2, the controller 3 supplies the proportional solenoid 52 with current of, for example 0.35 A at a stroke at a point within θ=1 deg. Further, the exciting current of the proportional solenoid 52 is controlled in such a manner that the values of the current which is caused to flow in strokes of increasing and decreasing magnitude in terms of the angle of rotation of the manual brake lever differ by a predetermined value such as, for example, 0.25 A and form an oppositely directed hysteresis loop. In other words, the controller 3 controls the exciting current supplied to the proportional solenoid 52 in response to the amount of movement of or the amount of force applie to the manual brake lever such that the value of current to be supplied at a given angle of rotation of the brake lever when the amount of movement of or the force applied to the manual brake lever is being increased becomes larger than that at the same angle of rotation when such amount is being decreased. As a result, it is possible to obtain a relationship between the angle of rotation θ of the manual brake lever and the liquid pressure p to be generated wherein hysteresis is almost completely eliminated, as shown by the characteristic curve (b) in FIG. 13. Therefore, it is also possible to accomplish fine control of the output of the vacuum motor 1 through actuating pressure supplied from the control valve 4 by controlling the control valve 4 in a manner such as has been described above.

In the embodiment described, the manual brake sensor 2 is described as being one which detects the amount of movement of a manual brake lever or the angle of rotation of the same. However, the sensor 2 may alternatively be one such as a load sensor capable of detecting the operational force on the manual brake lever.

Furthermore, instead of detecting the amount of movement or the operating force applied to a manual brake lever, a push button switch or operating member may be mounted in the driver's compartment to allow the manual brake sensor 2 to detect the amount of movement or the amount of pressure applied to the push button switch.

In the embodiment, the vacuum motor 1 connected to a control valve 4 can be controlled by supplying current to the proportional solenoid 52 to drive the relay valve 53 of the control valve and in effecting remote control of the control valve 4, the proportional solenoid 52 may be connected solely to the lead wires which are to supply the control current. This allows a significant reduction in the restrictions on space involved when mounting the control valve 4 on a motor vehicle.

In the control valve used in the present embodiment, the amount of hysteresis loss with respect to the pressure difference generated with respect to input can be kept small since the sliding resistance of the input rod 97 and valve plunger 93 are low. It is therefore possible to make the control valve compact in size and also to reduce the consumption of power.

The O-rings disposed between the guide member 58 and the sleeve 59 and between the sleeve 59 and the base 70 may be eliminated and an O-ring may instead be disposed between the flange 68 of the base 70 and the case 54 such as to airtightly seal the interior of the case 54 together with the grommet 63.

Figure 16:
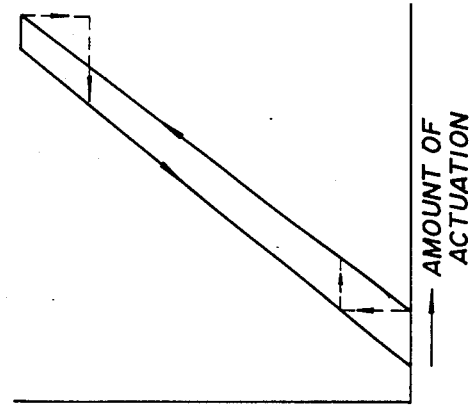
FIG. 16 is a diagram showing the characteristics of a braking device according to the second embodiment.
Figure 15:
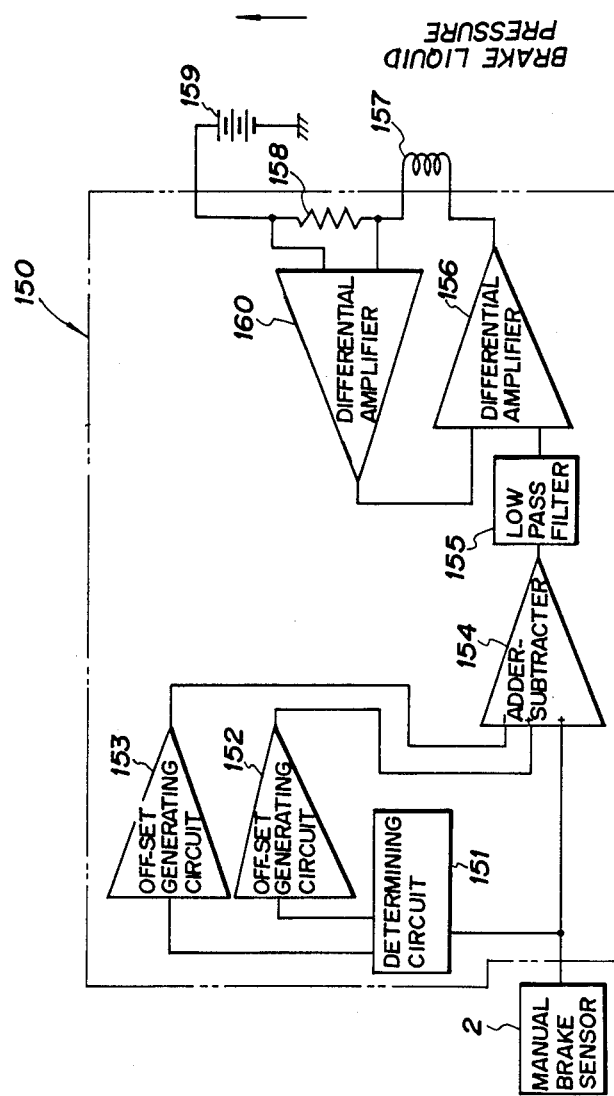
FIG. 15 is block diagram of a controller employed in the second embodiment.

Referring to FIGS. 15 and 16, a second embodiment of the invention will now be explained. This embodiment is similar to the first embodiment with the exception that a low pass filter is incorporated in the controller. Corresponding elements are therefore designated by the same reference numerals and explanation thereof will be omitted.

FIG. 15 is a block diagram of a controller as employed in the second embodiment.

A manual brake sensor 2 which consists of, for example, a potentiometer detects amounts of movement such as the angles of rotation of a manual brake lever mounted in the driver's compartment of a motor vehicle and outputs electric signals corresponding thereto. The output of the brake sensor 2 is input to a determining circuit 151 which determines whether the amount of movement of the brake lever is increasing or decreasing. The determining circuit 151 is adapted to selectively send respective signals corresponding to the results of this determination to a plus side off-set generating circuit 152 and a minus side off-set generating circuit 153. Provided for receiving the signals from the determining circuit 151, the off-set generating circuits 152 and 153 selectively output predetermined off-set signals for applying compensating voltage in the amount required for brake control or signals for compensating for the hysteresis of a vacuum motor, a linear solenoid and so on. The output of the offset circuit 152 or 153 is input to an inverted input terminal to and a non-inverted input terminal of an adder-subtracter 154. The adder-subtracter 154 has another non-inverted terminal to which the output of the brake lever sensor 2 is adapted to be input. The output of the adder-subtracter 154 is sent to a differential amplifier 156 for exciting a linear solenoid through a low pass filter 155. The differential amplifier 156 is connected to an electric source 159 through a linear solenoid 157 which constitutes a control valve 4 (see FIG. 1) and a detecting resistance 158. The opposite ends of the detecting resistance 158 are connected to input terminals of a differential amplifier 160 for detecting the exciting current of the linear solenoid 157. The output of the differential amplifier 160 is input to the differential amplifier 156 so as to form a feed back circuit.

Operation of a braking device including the controller described above will next be explained.

When a manual brake lever (not shown) is operated to apply the brakes or a given angle of rotation of the brake lever is made larger, the manual brake sensor 2 detects the angle of the brake lever. The determining circuit 151 receives signals from the sensor 2 and determines that the brake lever was being operated in the plus direction. Next, off-set signals from the off-set signal generating circuit 152 and output of the brake sensor 2 are input to the adder-subtracter 154 to compensate for any error between the amount of movement of the brake lever and the braking force being generated which may have been caused by hystereses of various components included in the control valve 4 and of movable components in a vacuum motor 1 (see FIG. 1). Then, certain signals representing the output of the adder-subtracter 154, namely signals caused by rapid change of current generated in the brake sensor 2 when braking operation starts, are cut by the low pass filter 30, so that only a steady-state output corresponding to the absolute value of an amount representing movement of the brake lever is input to the differential amplifier 156. Next, the linear solenoid 157 is excited through the output of the differential amplifier 156 and an amount of air corresponding to the amount of the brake lever movement is introduced from the control valve 4 to a second variable pressure chamber 17 of the vacuum motor 1 through a variable pressure chamber connecting port 19 (see FIG. 1). As a result, a control piston 14 is displaced leftwardly, together with a plunger 23, by virtue of the pressure difference between a second constant pressure chamber 16 and the second variable pressure chamber 17. Thus, the vacuum motor 1 generates an output force which is applied to an output rod as explained above in connection with the frist embodiment.

On the other hand, when the brake lever is moved back, off-set signals opposite to those in the case described above are input to the adder-subtracter 154. In this case, current supplied to the linear solenoid 157 is also controlled in correspondence with the absolute value of an amount which represents the movement of the brake lever and the pressure in the second variable pressure chamber 17 is controlled so that the output force of the vacuum motor 1 may thereby be controlled.

There exists a mutual relationship as is shown in FIG. 16 between the amount by which the brake lever is moved or the angle of rotation thereof and the brake liquid pressure. Namely, brake liquid pressure changes along a line designated by arrows in FIG. 16 when the brake lever is pulled out or returned. It is to be noted that the output of the brake sensor 2 generated momentarily when the brake lever is pulled out or returned has the purpose of forcing the brake liquid pressure to change rapidly in the way indicated by the dotted lines in FIG. 16. However, such output is cut off by the low pass filter 155. It is, therefore, possible to make the brake liquid pressure change in a manner such as that shown by the solid line in FIG. 16.

Although the above description has been given with respect to preferred embodiments of the invention, it is to be understood that the invention is not limited to those embodiments and that various changes or modifications can easily be made by those skilled in the art within the technical scope of the invention.

What is claimed is:

1. A braking device for use in a motor vehicle comprising:
   a vacuum motor having a casing;
   a power piston displaceably mounted in the casing through a diaphragm to partition the interior of the casing into a constant pressure chamber and a variable pressure chamber and displaceable by the pressure difference between the two chambers;
   an input rod adapted to be connected to a brake pedal;
   a valve mechanism disposed in the power piston for controlling the pressure in the variable pressure chamber in response to force applied to the input rod;
   a control valve connected to the vacuum motor for controlling the pressure in the variable pressure chamber independently from said valve mechanism, said control valve being electrically controllable for generating an output for controlling the pressure in the variable pressure chamber which is proportional to the current applied to the control valve;
   a controller for controlling the current applied to said control valve;
   a manual actuator for controlling said controller in response to an input applied to said manual actuator; and
   a sensor for detecting the amount of the input applied to said actuator and for sending an output corresponding to the amount of the input detected by said sensor to said controller;
   said controller including determining means for determining whether the amount detected by the sensor is on an increasing gradient or on a decreasing gradient and for generating signals corresponding to said determination, and control means for controlling the current to be applied to said control valve in response to the signals from said determining means for causing the current corresponding to the amount of input detected by the sensor as being on an increasing gradient and the current corresponding to the amount of input detected by the sensor as being on a decreasing gradient to be proportional respectively to the amount of the input applied to the manual actuator, and also for causing said current corresponding to an increasing gradient input and said current corresponding to a decreasing gradient input to be different from each other by a predetermined value with respect to the amount of the input applied to the actuator.

2. A braking device according to claim 1, wherein the control valve consists of a relay valve and a proportional solenoid for actuating the relay valve in proportion to the current applied thereto.

3. A braking device according to claim 2, wherein the braking device further comprises a control chamber defined in the power piston and a partition wall displaceably mounted in the control chamber for defining therein a second constant pressure chamber which permanently communicates with the first mentioned constant pressure chamber and a second variable pressure chamber, said control valve supplying driving pressure to the second variable chamber, and said partition wall being operatively connected to the valve mechanism for causing the partition wall to control the valve mechanism in response to the pressure difference generated between the two second chambers, thereby controlling the pressure in the first mentioned variable pressure chamber.

4. A braking device according to claim 1, wherein the controller includes a low pass filter for allowing only output of the sensor that is lower than a predetermined level to pass therethrough.

* * * * *